United States Patent

Cloarec

[11] Patent Number: 5,816,067
[45] Date of Patent: Oct. 6, 1998

[54] DEVICE FOR IN-LINE SURFACE-HARDENING OF PRODUCTS

[75] Inventor: Alain Cloarec, Longjumeau, France

[73] Assignee: L'Air Liquide, Societe Anonyme pour L'Etude et L'Exploitation des Procedes Georges Claude, Paris, France

[21] Appl. No.: 851,715

[22] Filed: May 6, 1997

[30] Foreign Application Priority Data

May 6, 1996 [FR] France ..................................... 96 05638

[51] Int. Cl.⁶ .................................................. F25D 17/02
[52] U.S. Cl. ................................................ 62/374; 62/380
[58] Field of Search .............................. 62/341, 63, 374, 62/380

[56] References Cited

U.S. PATENT DOCUMENTS

| 4,553,406 | 11/1985 | Richelli et al. ............................ 62/341 |
| 4,750,331 | 6/1988 | Barthelmes et al. . |
| 5,054,292 | 10/1991 | Klee . |

FOREIGN PATENT DOCUMENTS 2588067  4/1987  France .

*Primary Examiner*—Ronald C. Capossela
*Attorney, Agent, or Firm*—Burns, Doane, Swecker & Mathis, LLP

[57] ABSTRACT

A device for in-line surface hardening of products intended to feed a unit for preparation of the products, the unit being located downstream of the device comprising:

a chamber comprising a frigorie transfer means for surface hardening the products, at least one conveyor for introducing the products into the chamber and for extracting a surface hardened product and means for receiving a product request signal emitted by the preparation unit, means (i) or controlling the at least one conveyor so as, upon receiving a request signal, to extract from the chamber the surface-hardened product which has resided the longest in the chamber and, substantially at the same time, (ii) for introducing into the chamber a new product to be surface hardened, and means for controlling the frigorie transfer means so as to control the quantity of frigories to be transferred to the products present in the chamber per unit time as a function of at least one elapsed period between two successive times at which preceding request signals from the preparation unit were received.

7 Claims, 3 Drawing Sheets

DEVICE FOR IN-LINE SURFACE-HARDENING OF PRODUCTS

BACKGROUND OF THE INVENTION (i) Field of the Invention (ii) Description of the Related Art This device (12) for in-line surface hardening of products (P) is intended to feed a product preparation unit (14) located downstream. It includes a chamber (16) provided with frigorie transfer means (19) and a conveyor (18) for introducing the products into the chamber (16) and for extracting them. It comprises means (42, 44) for receiving a product request signal emitted by the said preparation unit (14) and means (42) for controlling the conveyor (18). It furthermore comprises means (42) for controlling the frigorie transfer means so as to control the quantity of frigories to be transferred to the products present in the chamber per unit time as a function of at least one elapsed period between two successive times at which preceding request signals from the preparation unit (14) were received.

The present invention relates to a device for in-line surface hardening of products, intended to feed a unit for preparation of the products, this being downstream of the device, of the type comprising a chamber provided with frigorie transfer means for surface hardening the products and at least one conveyor for introducing the products into the chamber and for extracting them. It will be appreciated that a "frigorie" is a negative calorie. The term is used when cold is transferred to an article such as during a food freezing operation by spraying a liquid cryogen on an article.

Surface hardening a product is an operation consisting in freezing the surface of at least one of the faces of the product for the purpose of facilitating its subsequent preparation. This technique is used in particular to facilitate the slicing of bars of ham and of pork loins, but is also applicable to other food products which have to undergo cutting, salami, dry sausage, sausages, cheese, fish.

Currently known surface-hardening machines are formed by tunnels, open at one end for introducing the products and at one end for extracting the products, and through which extends a continuously running conveyor for transporting the products. Placed into the tunnel are frigorie transfer means formed, in particular, by means for spraying a cryogenic fluid, for example liquid nitrogen.

The current tunnels operate continuously so that the products enter and leave the tunnel at a constant rate. If an incident occurs at a slicing unit located downstream of the tunnel, requiring the latter to be stopped for a prolonged period, the conveyor in the tunnel is stopped by an operator such that the products remain for a prolonged period inside the tunnel. They are thus cooled for an excessive period such that they are frozen too much, in particular frozen to the core.

Upon restarting the installation, there is a risk of the excessively frozen products leaving the tunnel damaging the cutting blades of the slicing unit.

Similar problems are encountered if the slicing unit is made to operate at a slower rate, for example because of a different setting for the thickness of the slices produced. It is then necessary manually to switch to a new setting of the conveyor's speed of advance, and/or to define a new set point for the frigorie transfer means.

SUMMARY AND OBJECTS OF THE INVENTION

The object of the invention is to provide an in-line surface-hardening device which does not have the above-mentioned drawbacks and, in particular, which enables a satisfactory state of surface-hardening of the products to be achieved whatever the rate of production of the product preparation unit located downstream.

For this purpose, the subject of the invention is a device for in-line surface hardening of products, intended to feed a unit for preparation of the products, this being located downstream, of the aforementioned type, characterized in that it comprises means for receiving a product request signal emitted by the said preparation unit, means for controlling the or each conveyor so as, upon receiving a request signal, to extract from the chamber the surface-hardened product which has resided the longest in the chamber and, substantially at the same time, to introduce into the chamber a new product to be surface hardened, and in that it comprises means for controlling the frigorie transfer means so as to control the quantity of frigories to be transferred to the products present in the chamber per unit time as a function of at least one elapsed period between two successive times at which preceding request signals from the preparation unit were received.

Depending on the particular embodiments, the surface-hardening device may have one or more of the following characteristics:

- the means for controlling the frigorie transfer means comprise means for storing in memory, for each product present in the chamber, the period that has elapsed since it was introduced into the chamber and the quantity of frigories transferred to this product, and they furthermore comprise means for computing the quantity of frigories to be transferred to the product which has resided the longest in the chamber, for the purpose of completing its surface hardening, and means for estimating the period until the time at which the next request signal is received, the quantity of frigories to be transferred to the products present in the chamber per unit time being determined from the computed quantity of frigories to be transferred to the product which has resided the longest in the chamber and from the said estimated period;

- the means for estimating the period that will have elapsed until the time when the next request signal is received comprise means for establishing the average of elapsed periods between the successive times at which the preceding request signals were received;

- the established average period is computed from the last k elapsed periods, k being the number of products contained in the chamber at the same time;

- it comprises means for stopping the frigorie transfer means should the period that has elapsed since the time at which the last request signal was received exceed a first predetermined period;

- it comprises means for ventilating the chamber, for the purpose of warming it up, should the period that has elapsed since the time at which the last request signal was received exceed a second predetermined period; and

- the chamber comprises doors for closing off the openings for introducing and extracting the products, these doors normally being closed outside the times of introduction and extraction of the products and the means for ventilating the chamber comprise means for momentarily opening these doors outside the introduction and extraction times.

The invention will be more clearly understood on reading the description which follows, given solely by way of example and with reference to the drawings in which:

DETAILED DESCRIPTION OF PREFERRED EMBODIMENTS

Figure 1:
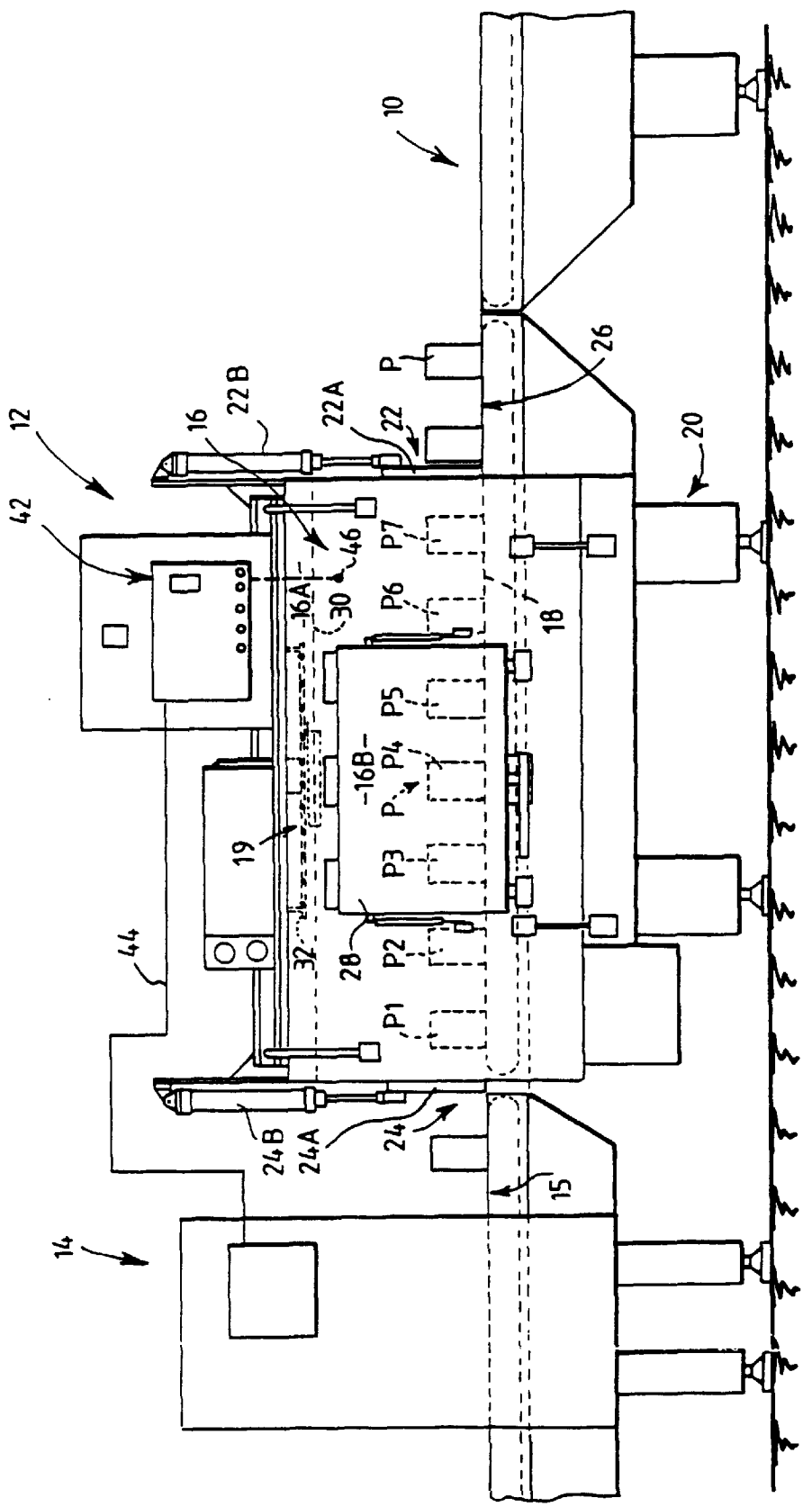
FIG. 1 is a diagrammatic view of a ham-slicing installation using a surface-hardening device according to the invention.

The installation shown in FIG. 1 is intended for slicing bars of ham. It comprises, in succession, a conveyor 10 for feeding in the bars of ham, a surface-hardening device 12 according to the invention and a unit 14 for slicing the surface-hardened bars of ham.

The latter is designed to cut the pre-surface-hardened bars of ham coming from the surface-hardening device 12 into slices of a defined thickness. It comprises a conveyor 15 which removes the bars of ham leaving the surface-hardening device 12. The slicing unit is designed to emit a signal for requesting a product (in this case, a block of ham) when the slicing of the previous product has been completed. Thus, the slicing machine may be fed continuously, thereby optimizing its efficiency.

The surface-hardening device 12 essentially comprises a chamber 16 in the form of a tunnel, through which passes a single conveyor 18 for transporting the products P to be surface hardened. This conveyor 18 is formed, for example, by a belt conveyor. The chamber 16 comprises means 19 for transferring frigories to the products P.

The chamber 16 is supported by a frame 20 resting on the ground. It is of general parallelepipedal shape and comprises two opposite openings 22, 24 forming respectively an opening for introducing the products to be surface hardened and an opening for extracting the surface-hardened products. The length of the chamber, measured between the two opposite openings, is limited to the length necessary for placing on the conveyor, one after the other, a set of seven products which are to be surface hardened.

The conveyor 18 passes through the introduction opening 22. Its front end delimits, in front of the chamber 16, a stand-by area 26 for the products before they are introduced into the chamber. The conveyor passes right through the chamber, coming to an end immediately upstream of the extraction opening 24.

Each opening 22, 24 is associated with a sliding closure door, denoted respectively 22A, 24A. Each door is actuated by a cylinder actuator 22B, 24B enabling it to move between a position in which the opening is closed off, isolating the inside of the chamber from the ambient medium, and a retracted position in which the opening is exposed, enabling the products to pass through and ensuring free communication between the inside of the chamber and the ambient medium.

In its side walls, the chamber 16 comprises articulated flaps 28 allowing access to the inside of the chamber, especially in order to clean it.

All the walls of the chamber, the doors 22A, 24A and the flaps 28 are lined with a thermal insulation in order to avoid heat transfer between the inside of the chamber and the ambient medium.

The chamber 16 is separated longitudinally into two compartments 16A, 16B by a horizontal partition 30. The lower compartment 16A, through which the conveyor 18 passes, forms the space for surface hardening the products.

Figure 2:
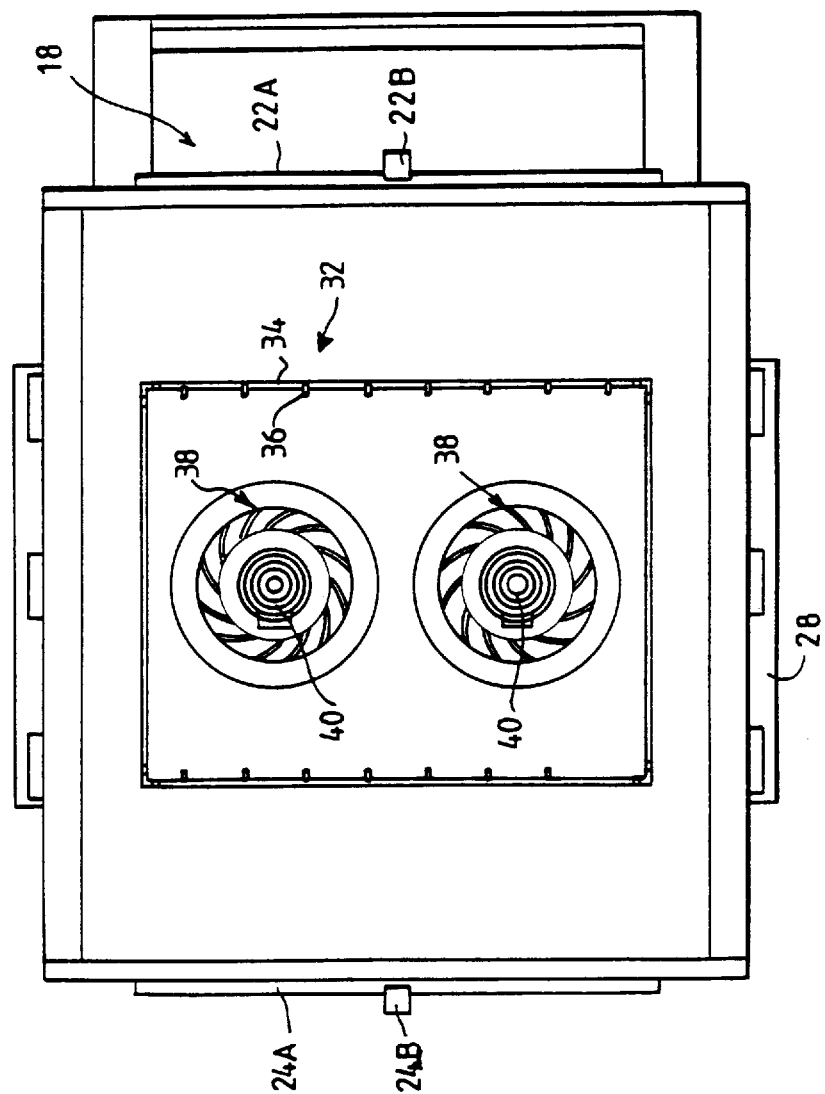
FIG. 2 is a view of the surface-hardening device of FIG. 1 from above, the top cover of which having been removed.

The upper compartment 16B, which may be seen in FIG. 2, houses means 32 for spraying liquid nitrogen. The latter comprise, for example, a ring-shaped pipe 34 carrying spray nozzles 36. This ring is connected to controllable liquid-nitrogen supply means (not shown).

Moreover, two passages 38, made in the wall 30 and across each of which is placed a fan or turbine 40, ensure that the sprayed nitrogen is transferred from the upper compartment 16A to the lower compartment 16B in order to ensure transfer of frigories to the products P to be surface hardened. Thus, the inside of the chamber is maintained at a temperature substantially equal to −80° C. and a flow of low-temperature gaseous nitrogen is maintained around the products, thus ensuring that they are surface hardened by forced convection.

The surface-hardening device furthermore comprises control means 42 formed, for example, by a programmable controller. They are designed especially to control the stepwise advance of the conveyor 18, the actuation of the cylinder actuators 22A, 22B and the regulation of the frigorie transfer means 19. In particular, the control means 42 are designed to control the operation of the fans 40 and supply for the spray means 32 so as to ensure that a defined quantity of frigories are transferred to the products P per unit time.

A temperature probe 46, connected to the control means 42, is furthermore provided in the lower compartment 16B.

The control means 42 are connected via a data transmission line 44 to the slicing unit 14 in order to receive from it a product request signal. They are designed to compute the elapsed period between two successive times at which a product request signal was received. These elapsed periods are stored in a stack whose structure will be described below.

As shown in FIG. 1, the length of the chamber 16 is designed for housing, at the same time, seven products to be surface hardened, the products being spaced apart by the same separating interval. The conveyor 10 is synchronised with the conveyor 18 of the surface-hardening device in order to feed the products spaced apart by the said interval onto the stand-by area 26.

The products contained in the chamber are in different states of surface hardening. The surface hardening of the product $P_1$ located immediately upstream of the extraction door 24A and the one which has resided the longest in the chamber is practically complete. On the other hand, the product $P_7$ located immediately downstream of the inlet door 22A and the last to enter the chamber is at the first stage of surface hardening. The products $P_2$ to $P_6$ are in intermediate states of surface hardening.

Figures 3, 4:
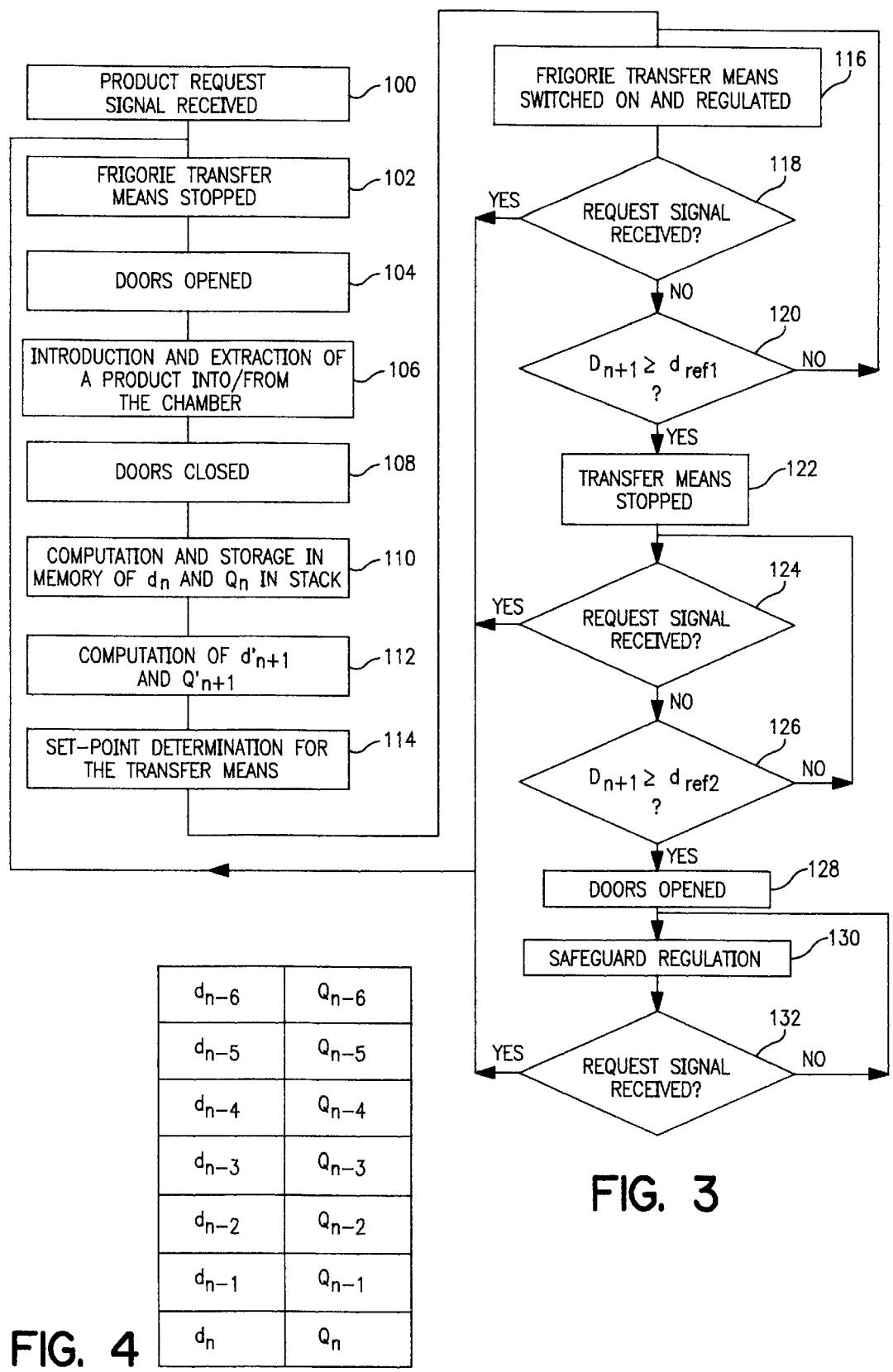
FIG. 3 is a flow diagram explaining the steps implemented by the means for controlling the surface-hardening device according to the invention.
FIG. 4 is a diagram showing the structure of the stack of data stored in memory by the control means.

The operation of the surface-hardening device will now be described with regard to the flow diagram in FIG. 3, explaining the control procedure implemented by the control means 42 in the steady operating state of the installation.

Upon receiving a product request signal at step 100, the control means 42, at step 102, stop the frigorie transfer means 19 by cutting off the nitrogen supply and possibly stopping the fans 40. At step 104, they actuate the cylinder actuators 22B and 24B in order to open the doors. Next, at step 106, they advance the conveyor 18 by one step so that the latter extracts the surface hardened product P longest in the chamber 16 from the chamber and at the same time introduces, through the door 22, a new product to be surface hardened. After this, the doors are closed at step 108.

Moreover, at step 110, the control means 42 compute the elapsed period $d_n$ between the last two request signals received. They store this value in memory in a stack R having seven elements of the "first in-first out" (commonly called FIFO) type, the structure of which is shown in FIG. 4. Thus, this stack contains the periods of the seven last operating cycles of the device, a cycle having taken place between two successive product requests.

The control means 42 furthermore store in memory, in the said stack, the quantity of frigories, denoted $Q_n$, transferred to each product in the chamber during the last cycle that has elapsed. Each product contained in the chamber is designed to receive the same quantity of frigories and this can be computed from the temperature measured at each time in the chamber and from the period of the cycle.

It is thus possible from the data contained in the stack R to determine the quantity of frigories transferred to each product since its entry into the chamber and its corresponding state of surface hardening, as well as the period that has elapsed since its introduction.

At step 112, the control means 42 compute the estimated period of the next cycle, denoted $d'_{n+1}$. To do this, they make an approximation of the latter by averaging the seven computed periods stored in the stack R.

During this same step, they compute the quantity of frigories $Q'_{n+1}$ which have to be transferred to the product which has resided the longest in the chamber in order for its surface-hardening to be completed. Based on this quantity, the control means 42 determine, at step 114, the set point for regulation of the transfer means 19 so that the quantity $Q'_{n+1}$ of frigories is transferred steadily during the estimated period $d'_{n+1}$ of the cycle. This set point corresponds in practice to the quantity of frigories to be transferred to the products in the chamber per unit time. The transfer means 19 are then put into operation, at step 116, in accordance with this set point.

During operation of the frigorie transfer means, as soon as the control means 42 receive, at step 118, a product request signal, steps 102 to 116 are once again implemented, a surface-hardened product being extracted from the chamber and a new product to be surface hardened being introduced thereinto.

If, at step 120, the measured period $D_{n+1}$ that has elapsed since the last product request signal was received is greater than a first predetermined period $d_{ref1}$, for example equal to 110% of the estimated period $d'_{n+1}$, the control means 42, at step 122, stop the frigorie transfer means 19 or reduce their flow rate so as to avoid excessive surface hardening of the products. This excessive surface-hardening could in fact be harmful to the slicing unit located downstream. Such a delay in receiving the request signal may be due to a change in the operating cycle of the slicing unit, or else to an incident that has occurred therein.

If, at step 124, a request signal is received, then steps 102 to 116 are again implemented. If this is not so and if the period $D_{n+1}$ that has elapsed since the last request signal was received is greater than a second predetermined period $d_{ref2}$, for example equal to 120% of the period $d'_{n+1}$ (step 126), then, at step 128, the control means 42 actuate the cylinder actuators 22B and 24B in order to open the doors. Thus, the inside of the chamber is brought into contact with ambient air in order to cause ventilation leading to a rise in the temperature inside the chamber and thus to prevent the products to be surface hardened from being frozen to the core.

Next, at step 130, the control means 42 adaptively control the frigorie transfer means 19 and the opening of the doors 22A, 24A so as to seek to keep an acceptable level of surface hardening in the product which has resided the longest in the chamber. This step 130 is completed when, at step 132, a request signal is obtained. Steps 102 to 116 are then implemented.

It is possible, upon computing the average period $d'_{n+1}$ for estimating the period of the cycle in progress, to exclude from the computation of the average the periods longer than a predetermined value, for example those equal to the second predetermined value $d_{ref2}$, which correspond to abnormal operating cycles of the slicing unit (breakdown or change of setting).

During the operation of the installation, average values are stored in the registers of the stack R for the periods and the quantities of frigories transferred.

With such an installation, it is conceivable that the operating cycles may be of variable length, without this affecting the state of surface hardening of the products. Even should there be major problems with the slicing unit, causing it to be shut down for a prolonged period, there is no risk of the products being excessively frozen and thereby possibly damaging the blades or any other part of the slicing unit.

The surface-hardening device described here comprises means for transferring frigories by forced convection. However, any other frigorie transfer means may be used, for example means for spraying a cryogenic liquid directly onto the products or else bringing the products into contact with this cryogenic liquid. In addition, in the installation described, the liquid nitrogen may be replaced by liquid carbon dioxide for supplying the spray ring.

In the example described, the device is applied to determining the quantity of frigories to be transferred to the products contained in the chamber. In particular, the values stored in the stack R correspond to the quantities of frigories received by the products during each cycle. However, the device may, as a variant, be applied to regulating the temperature in the lower compartment 16B of the chamber. This is because the quantity of frigories transferred is directly related to the temperature in the chamber and to the residence time, so that controlling the quantity of frigories transferred and controlling the temperature in the chamber are equivalent. In this case, the values stored in the stack R, in addition to the period of each cycle, include the temperature of the lower compartment of the chamber, measured by the sensor 46.

As a variant, the surface-hardening device may have several independent conveyors.

I claim:

1. A device for in-line surface hardening of products, intended to feed a unit for preparation of the products, said unit being located downstream of the device comprising:

a chamber comprising a frigorie transfer means for surface hardening the products, at least one conveyor for Introducing the products into the chamber and for extracting a surface hardened product and means for receiving a product request signal emitted by said preparation unit, means for (i) controlling said at least one conveyor so as, upon receiving a request signal, to extract from the chamber the surface-hardened product which has resided the longest in the chamber and, substantially at the same time, (ii) for introducing into the chamber a new product to be surface hardened, and means for controlling the frigorie transfer means so as to control the quantity of frigories to be transferred to the products present in the chamber per unit time as a function of at least one elapsed period between two successive times at which preceding request signals from the preparation unit were received; and means for conveying the product from the chamber to the preparation unit.

2. The device according to claim 1, wherein the means for controlling the frigorie transfer means comprise:

means for storing in memory, for each product present in the chamber, the period that has elapsed since it was introduced into the chamber and the quantity of frigories transferred to this product, means for computing the quantity of frigories to be transferred to the product which has resided the longest in the chamber, for the purpose of completing its surface hardening, and means for estimating the period until the time at which the next request signal is received, the quantity of frigories to be transferred to the products present in the chamber per unit time being determined from the computed quantity of frigories to be transferred to the product which has resided the longest in the chamber and from said estimated period.

3. The device according to claim 2, wherein the means for estimating the period that will have elapsed until the time at which the next request signal is received comprise means for establishing an average of elapsed periods between successive times at which the preceding request signals were received.

4. The device according to claim 3 wherein the established average period is computed from the last k elapsed periods, k being the number of products contained in the chamber at the same time.

5. The device according to claim 1 further comprising means for stopping the frigorie transfer means when the period that has elapsed since the time at which the last request signal was received exceeds a first predetermined period.

6. The device according to claim 1 further comprising means for ventilating the chamber, for the purpose of warming it up, when the period that has elapsed since the time at which the last request signal was received exceeds second predetermined period.

7. The device according to claim 6 wherein the chamber further comprises doors for closing off openings for introducing and extracting the products, said doors normally being closed outside times of introduction and extraction of the products, and wherein the means for ventilating the chamber comprise means for momentarily opening said doors outside the introduction and extraction times.

* * * * *